US010800242B2

(12) United States Patent
Langhoff et al.

(10) Patent No.: US 10,800,242 B2
(45) Date of Patent: Oct. 13, 2020

(54) VEHICLE AXLE FOR A MOTOR VEHICLE

(71) Applicant: AUDI AG, Ingolstadt (DE)

(72) Inventors: Hans-Jürgen Langhoff, Lenting (DE); Sven Schmalzrieth, Ingolstadt (DE); Vladimir Idelevitch, Nuremberg (DE); Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/726,924

(22) Filed: Oct. 6, 2017

(65) Prior Publication Data

US 2018/0105027 A1   Apr. 19, 2018

(30) Foreign Application Priority Data

Oct. 18, 2016   (DE) .................. 10 2016 220 414

(51) Int. Cl.
| | |
|---|---|
| *B60K 1/02* | (2006.01) |
| *B60K 7/00* | (2006.01) |
| *B60K 17/04* | (2006.01) |
| *B62D 21/11* | (2006.01) |
| *B62D 27/02* | (2006.01) |
| *B62D 27/04* | (2006.01) |

(52) U.S. Cl.
CPC .............. *B60K 1/02* (2013.01); *B60K 7/0007* (2013.01); *B60K 17/043* (2013.01); *B62D 21/11* (2013.01); *B62D 27/02* (2013.01); *B62D 27/04* (2013.01); *B60K 2007/0046* (2013.01); *B60K 2007/0061* (2013.01)

(58) Field of Classification Search
CPC ...... B60K 7/0007; B60K 17/043; B60K 1/02; B60K 2007/0061
See application file for complete search history.

(56) References Cited

U.S. PATENT DOCUMENTS

| | | | |
|---|---|---|---|
| 1,251,749 A | | 1/1918 | Cilley |
| 2,047,050 A | * | 7/1936 | Armington ............ B60K 1/02 180/6.44 |
| 5,829,542 A | * | 11/1998 | Lutz ..................... B60K 1/02 180/65.6 |
| 6,557,656 B2 | * | 5/2003 | Haniu ................... B60K 6/24 180/65.21 |

(Continued)

FOREIGN PATENT DOCUMENTS

| | | |
|---|---|---|
| CN | 200939826 Y | 8/2007 |
| CN | 102166951 A | 8/2011 |

(Continued)

OTHER PUBLICATIONS

German Search Report dated Mar. 5, 2018 in corresponding German Application No. 102016220414.9; 9 pgs.

(Continued)

*Primary Examiner* — Brian L Swenson
(74) *Attorney, Agent, or Firm* — Maier & Maier, PLLC

(57) ABSTRACT

In a vehicle axle for a motor vehicle, two electric drives are arranged in a frame construction for driving the wheels of an axle. The frame construction is provided with at least one transverse carrier, which is at its ends connected to longitudinal carriers. The two electric drives are arranged approximately axially parallel next to each other with their axes of rotation arranged transversely to the direction of travel. The at least one transverse carrier extends between the two electric drives.

7 Claims, 1 Drawing Sheet

(56) References Cited

U.S. PATENT DOCUMENTS

| | | | |
|---|---|---|---|
| 6,698,313 B2 * | 3/2004 | Gaffney | B60K 17/043 |
| | | | 74/665 N |
| 9,724,990 B2 | 8/2017 | Hoermandinger et al. | |
| 2003/0111280 A1 * | 6/2003 | Platner | B60K 1/02 |
| | | | 180/65.6 |
| 2003/0132039 A1 | 7/2003 | Gaffney et al. | |
| 2008/0179116 A1 * | 7/2008 | Ikenoya | B60G 3/20 |
| | | | 180/63 |
| 2008/0230289 A1 * | 9/2008 | Schoon | B60K 1/02 |
| | | | 180/65.6 |
| 2009/0014223 A1 * | 1/2009 | Jones | B60K 17/16 |
| | | | 180/65.8 |
| 2010/0108417 A1 * | 5/2010 | Gilmore | B60K 6/448 |
| | | | 180/65.51 |
| 2011/0094807 A1 * | 4/2011 | Pruitt | B60K 1/04 |
| | | | 180/65.6 |
| 2011/0209934 A1 * | 9/2011 | Armbruster | B60K 7/0007 |
| | | | 180/65.25 |
| 2011/0259657 A1 | 10/2011 | Fuechtner | |
| 2012/0103708 A1 * | 5/2012 | Hennings | B60K 7/0007 |
| | | | 180/65.6 |
| 2014/0117654 A1 * | 5/2014 | Buschjohann | B60G 3/18 |
| | | | 280/795 |
| 2016/0297385 A1 * | 10/2016 | Hoshinoya | B60K 1/02 |
| 2018/0250982 A1 * | 9/2018 | Albl | B60B 35/124 |

FOREIGN PATENT DOCUMENTS

| | | |
|---|---|---|
| CN | 102233810 A | 11/2011 |
| CN | 102815191 A | 12/2012 |
| DE | 29518401 U1 | 3/1997 |
| DE | 202004016348 U1 | 12/2004 |
| DE | 102010010438 A1 | 9/2011 |
| DE | 102010017966 A1 | 10/2011 |
| DE | 102012000622 A1 | 7/2013 |
| DE | 102013006702 A1 | 10/2014 |
| DE | 202013011046 U1 | 3/2015 |
| DE | 102014102541 A1 | 8/2015 |
| GB | 156398 A | 1/1921 |
| WO | 2003101765 A2 | 12/2003 |
| WO | 2007133368 A2 | 11/2007 |

OTHER PUBLICATIONS

Office Action dated Dec. 3, 2019 in corresponding Chinese Application No. 201710958288.7; 16 pages including machine generated English-language translation.

Office Action dated Aug. 5, 2020 in corresponding German Application No. 10 2016 220 414.9; 13 pages including partial machine-generated English-language translation.

* cited by examiner

VEHICLE AXLE FOR A MOTOR VEHICLE

FIELD

The invention relates to a vehicle axle for a motor vehicle.

BACKGROUND OF THE INVENTION

In DE 10 2014 102 541 A1 is described a vehicle axle of this type, wherein two electric drives with two cross braces are arranged one after another in the frame construction transversely to the driving direction.

DE 10 2010 017 966 A1 shows and describes a vehicle axle with two electric drives, which are arranged next to each other and connected via a gear with drive shafts of a drive driving two wheels of a vehicle.

SUMMARY OF THE INVENTION

The object of the present invention is to provide a vehicle axle of the type mentioned above, wherein the electric drives are arranged in a frame construction in a manner that is convenient for installation.

By taking advantage of the intermediate space, an arrangement that is advantageous for installation is created between the at least approximately parallel drives. In particular, the result is that a very flat suspension design can be obtained in this manner for both drives.

In an advantageous embodiment of the invention, the two drives are elastically suspended in the frame construction, which is provided with a transverse carrier having longitudinal carriers attached at its ends.

For the elastic suspension of the two drives can be used bearing locations, which are arranged at the transverse carrier and which are connected to the drive housings of the electric drives. Also, a connection of bearing locations to the transmission gear of the electric drives can be also provided.

The entire frame construction can be connected in an embodiment according to the invention via elastic bearing locations to the vehicle body of the motor vehicle. However, it is of course also possible to use a rigid bearing of the frame construction.

According to the invention it can also be provided that at least one transverse carrier is arranged in the horizontal direction (the z axle of the motor vehicle) below the two electric drives.

This also creates an arrangement that is advantageous from the viewpoint of the installation space.

Preferred modifications and embodiments can be derived from the remaining dependent claims and from the attached figures explaining the principles of the described embodiment.

DETAILED DESCRIPTION OF THE INVENTION

Figure 1:
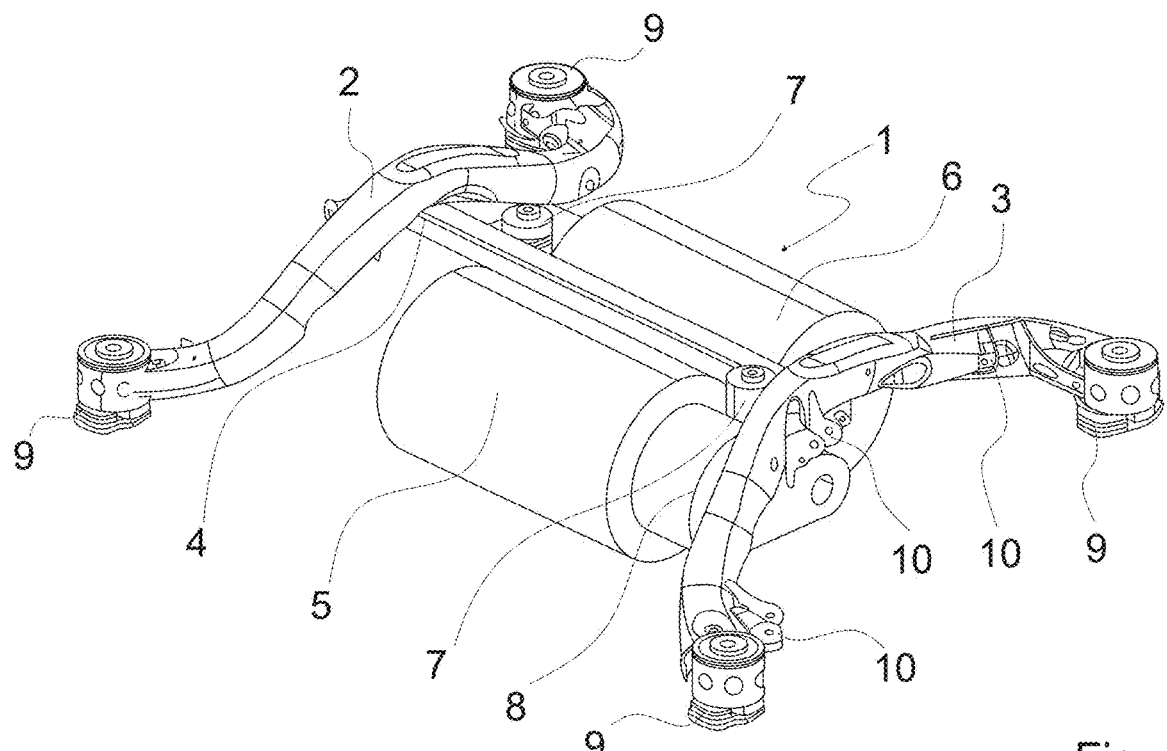
FIG. 1 a perspective view of the motor vehicle axle according to the invention.

Referring to FIG. 1, the motor vehicle axle of a motor vehicle is provided with a frame construction 1, which is equipped with two longitudinal carriers 2 and 3. The longitudinal carriers 2 and 3 are respectively connected to the ends of a transverse carrier 4. The transverse carrier 4 is located in an intermediate space between the two drivers 5 and 6, which are arranged in an intermediate space so that they are axially parallel to each other. Thus, the transverse carrier 4 can extend between the two electric drives 5 and 6. Further, the first longitudinal carrier 2 and the second longitudinal carrier 3 may have curved structures, and the transverse carrier 4 can be connected at its ends with middle points of the curved structures.

The two electric drives 5 and 6 are arranged in such a way that the rotational axes of the drives 5, 6 lie in the transverse direction of the drives 5, 6.

The two drives 5 and 6 are provided with a plurality of bearing locations. So for example, the bearing locations 7 can be arranged on the transverse carrier 4, which can be connected either to the drive housings of the drive 5 and 6 and/or also to the transmission gears 8 for both drives 5 and 6.

In addition, bearing locations can be also arranged on the longitudinal carriers 2, 3 (not illustrated).

Figure 2:
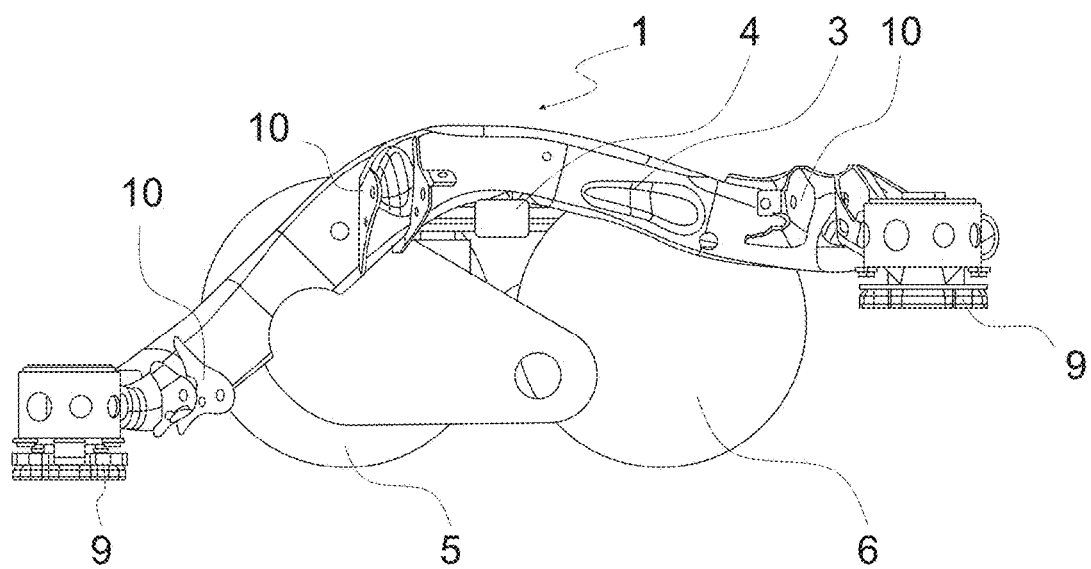
FIG. 2 a view of the motor vehicle axle transversely to the direction of the travel of the motor vehicle.

Referring now to FIG. 2, the entire frame construction 1 can be arranged via elastic carriers 9, which are arranged at the ends of the longitudinal carriers 2, 3, to the vehicle body of the vehicle. Each of the first longitudinal carrier 2 and the second longitudinal carrier 3 may have a first elastic bearing location and a second elastic bearing location, and the first elastic bearing location can be above the second bearing location in the height direction.

It is of course also possible to connect the frame construction 1 rigidly between an intermediate coupling of the bearing locations to the vehicle body, for example by means of screws.

The two longitudinal carriers 2, 3 are provided with brackets 10 that are used as linkage points for the vehicle body steering arms.

It goes without saying that within the context of the invention it is also possible to install another transverse carrier instead of using only one transverse carrier 4 as illustrated in the figure. This transverse carrier could be arranged for example between an electric drive 5 or 6 and an elastic bearing 9.

The invention claimed is:

1. A vehicle axle for a vehicle comprising:
two electric drives arranged in a frame construction for driving the wheels of an axle, wherein a frame construction is provided with one transverse carrier, which is connected at its ends with a first longitudinal carrier and a second longitudinal carrier, wherein the two electric drives are arranged at least approximately axially parallel next to each other and to the transverse carrier, wherein with the axes of rotation of the two electric drives are arranged transversely to a direction of the travel, and wherein the transverse carrier extends between the two electric drives,
wherein bearing locations for the two electric drives are arranged on the transverse carrier, the first longitudinal carrier, and the second longitudinal carrier,
wherein the first longitudinal carrier and the second longitudinal carrier have curved structures, and the transverse carrier is connected at its ends with middle points of the curved structures.

2. The vehicle axle according to claim 1, wherein the electric drives are elastically suspended in the frame construction.

3. The vehicle axle according to claim 1, wherein the bearing locations for the electric drives are connected to the drive housings of the electric drives.

4. The vehicle axle according to claim 1, wherein the bearing locations are connected to transmission gears for the electric drives.

5. The vehicle axle according to claim 1, wherein the frame construction is connected via elastic bearing locations to the vehicle body of the motor vehicle each of the first longitudinal carrier and the second longitudinal carrier has a first elastic bearing location and a second elastic bearing location, and the first elastic bearing location is above the second bearing location in the height direction.

6. The vehicle axle according to claim 1, wherein the frame construction is connected via a rigid connection to the vehicle body.

7. A vehicle axle for a motor vehicle, comprising:
a frame construction is arranged with two electric drives for driving the wheels of an axle, wherein the frame construction is provided with one transverse carrier, which is connected at its ends to a first longitudinal carrier and a second longitudinal carrier, wherein the two electric drives are arranged at least approximately axially parallel next to each other and to the transverse carrier, wherein the axes of rotation of the two electric drives are arranged transversely to the driving direction, and wherein the transverse carrier is arranged below the two electric drives in the height direction,
wherein bearing locations for the two electric drives are arranged on the transverse carrier, the first longitudinal carrier, and the second longitudinal carrier, and wherein the transverse carrier extends between the two electric drives,
wherein the first longitudinal carrier and the second longitudinal carrier have curved structures, and the transverse carrier is connected at its ends with middle points of the curved structures.

* * * * *